E. R. HOLDEN.

PROCESS OF ELECTROCHEMICAL PRECIPITATION OF METALS.

APPLICATION FILED OCT. 30, 1919.

Reissued Apr. 27, 1920. 14,849.

2 SHEETS—SHEET 1.

E. R. HOLDEN.

PROCESS OF ELECTROCHEMICAL PRECIPITATION OF METALS.

APPLICATION FILED OCT. 30, 1919.

Reissued Apr. 27, 1920. 14,849.

2 SHEETS—SHEET 2.

WITNESS

E. Mitchell

INVENTOR

Edward Royal Holden

BY

ATTORNEY

UNITED STATES PATENT OFFICE.

EDWARD ROYAL HOLDEN, OF LOS ANGELES, CALIFORNIA.

PROCESS OF ELECTROCHEMICAL PRECIPITATION OF METALS.

14,849. Specification of Reissued Letters Patent. Reissued Apr. 27, 1920.

Original application filed October 10, 1916, Serial No. 124,902. Renewed November 5, 1917, Serial No. 200,456. Original No. 1,269,565, dated June 11, 1918. Application for reissue filed October 30, 1919. Serial No. 334,552.

*To all whom it may concern:*

Be it known that I, EDWARD ROYAL HOLDEN, a citizen of the United States, residing at Los Angeles, in the county of Los Angeles and State of California, have invented new and useful Improvements in Processes of Electrochemical Precipitation of Metals, of which the following is a specification.

This invention relates to an improved process for electrolytically treating solutions containing metallic substances and the attainment of a rapid, economical and efficient method of precipitating and recovering metals from solutions.

This process is more particularly adapted to the precipitation of metals from chlorid, cyanid, sulfate or other dissolving solutions containing gold, silver, copper or other metals, either single or together. The essence of this invention resides in the process of distributing and disseminating an electric current, hereinafter fully set forth, and illustrated in the accompanying drawings, in which.

To carry out the action above referred to in the most advantageous manner, I preferably use a circular tank of any reasonable number of feet in diameter, and of a depth sufficient to hold large quantities of solution containing metals in solution.

Figure 1:
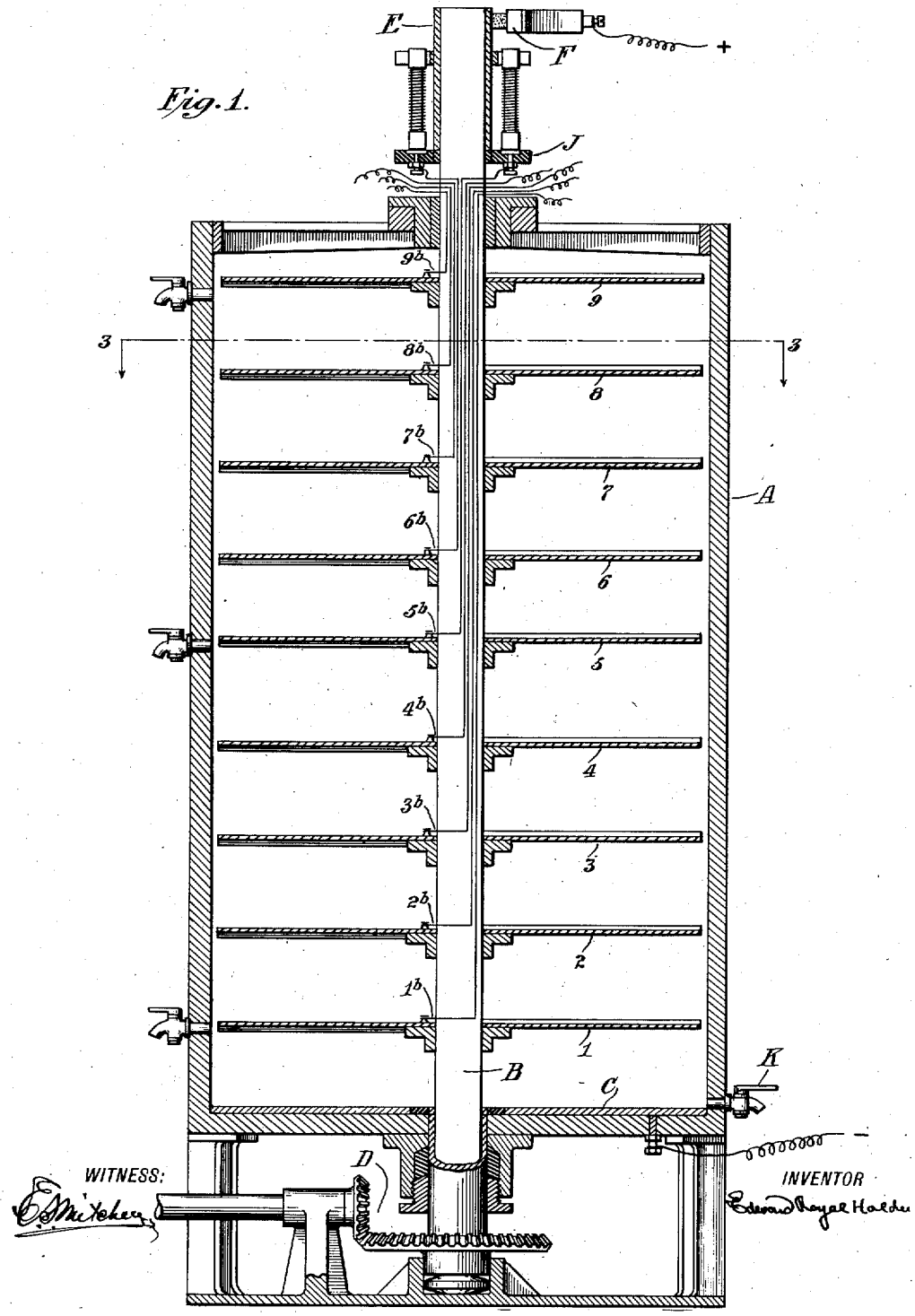
Figure 1 is a view in vertical section, partly in elevation, of an apparatus employed in carrying out my process, showing a part of the electrical device in diagram.
Figure 2:
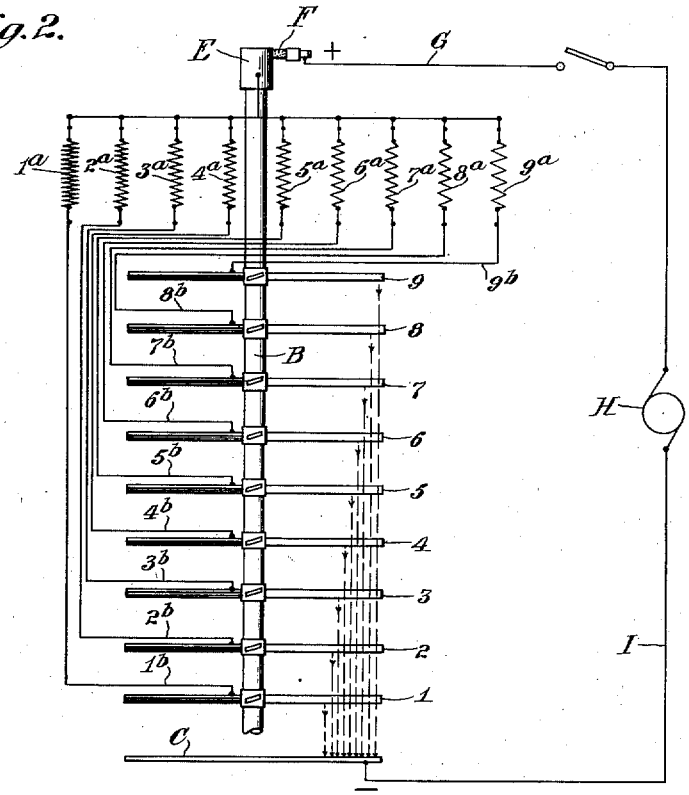
Fig. 2 is a diagrammatic view illustrating the electric circuits and the manner of distributing the electric current throughout an electrolyte.
Figure 3:
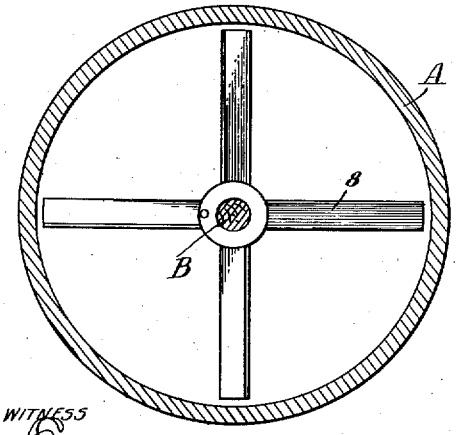
Fig. 3 is a view in horizontal section on a reduced scale, as seen on the line 3—3, of Fig. 1.
Figure 4:
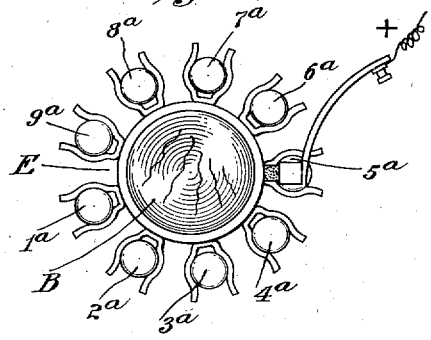
Fig. 4 is a detail in plan of the revolving resistance coil carriage and the wiper contact for delivering electric current thereto.

In Figs. 1 and 2 of the accompanying drawing, I have illustrated by a vertical sectional view, and in diagram, one embodiment of a tank showing fully the manner of wiring; the resistance coils necessary for the regulation of the current; the various anodes and their respective distances from the cathode; a non-conducting shaft, said shaft being constructed of any suitable material, such as hard wood, hard rubber or other material, not affected by acid or alkaline solutions, nor electrolysis, together with a copper, mercury or other negative cathode on the bottom of the tank.

More specifically in the drawing, A indicates a tank of any suitable material, preferably wood, about six feet in diameter, and twelve feet in depth, although other sizes may be found advantageous. In this tank a vertical shaft B of non-conducting material is mounted, and throughout its entire height at equal distance apart, carries a number of metallic paddles as anodes numbered from 1 to 9; anode 1 being placed just above a cathode C, comprising a copper or other metallic plate or mercury arranged to cover the bottom of the tank. The paddles are here shown as comprising four blades to a set constituting a separate anode. By repeated experiments I have found that in a tank twelve feet deep filled with a solution containing metals in solution, the best electrolytic precipitation is obtained when the metallic anodes are set about twelve to fifteen inches apart; the lowest anode 1 being six to twelve inches, more or less, above the cathode C. The shaft is rotated by gearing D or other suitable means.

On the upper part of the non-conducting shaft is a circular metallic contact ring E connected with a positive current of electricity, through a wiper contact F connected with a conductor G leading from one terminal of a source of electrical supply or generator H; a conductor I leading from the other terminal of the generator to the cathode C. On the lower end of the metallic contact ring E and attached thereto is a circular disk J of hard rubber or other non-conducting substance, Resting upon and attached to the disk J are separately wound individual resistance coils $1^a$ to $9^a$, as shown in Fig. 2, there being one resistance coil for each of the anodes attached to the shaft. The top of each resistance coil is connected with the contact ring E and the positive current of electricity passes from the contact ring into each resistance coil, the lower ends of which are resting on the disk J and each coil is connected with its own separate insulated wire or conductor $1^b$ to $9^b$, leading down through the electrolyte to an anode. Each one of these separate resistance coils is so wired as to convey a regulated and controlled volume of electricity to the anode to which it is attached; the separate coils being graded in decreasing degrees of resistance according to the distance of the anodes from the cathode, for example, coil $1^a$ connecting with the lowermost anode 1 is of greatest resistance and coil $9^a$ connecting with the uppermost anode of the least resistance, with the intermediate coils stepped down in uniform degrees of resistance as the distance of the anodes from the cathode is increased, thus introducing an independent electric current through each anode of such amperage as will overcome the added resistance caused by the distance of each anode from the cathode. Each anode thus becomes an independent one, capable of disseminating the necessary amount of current density through the solution to overcome the resistance caused by the distance of each anode from the cathode whereby the electric current passing into the electrolyte is distributed throughout the whole solution in such a manner that the metals in solution are immediately and uniformly liberated into metallic ions from their compound condition and are precipitated on the cathode; the detailed operation of which is hereafter more fully explained.

At the bottom of the tank A is a draw off pipe K, for the purpose of drawing off the mercury cathode or removing precipitates from the surface of any cathode used.

The shaft B extends through the bottom of the tank A and is supported by an ordinary stuffing box and the end of the shaft operates in an ordinary ball bearing box.

The anodes described and attached to the non-conducting shaft are made of any material best suited to the precipitation of the metals in solution and are positive to the metallic substances used as a cathode and while revolving in the tank, also serve as agitators for the solution, and through the separate resistance coils which are in contact with the wires leading to each anode, disseminate throughout the electrolyte, between each anode and the cathode, the different amperages necessary in every part of the solution to establish the most effective precipitating potential throughout the whole solution.

For the information of those not versed in the art of direct current dissemination through an electrolyte containing metals in solution and for their precipitation and recovery and to increase the efficiency and potential conditions necessary in conducting electricity into a liquid, and for clearly exemplifying the improvement in the method of disseminating varying quantities of E. M. F. to separate anodes throughout the electrolyte, I herewith append the results of the following tests conducted for the purpose of advancing the art and to illustrate the improvements over those indicated in my previous Letters Patent granted April 25th 1916, numbered 1,181,077, and entitled "Process of treating ores bearing precious metals."

I found by experiment in a tank three feet in diameter and nine feet in depth, containing a solution carrying gold and silver in solution, with sufficient sodium chlorid present to establish the necessary conductivity and a current of positive electricity passing down through the electrolyte, by means of separate wires attached to a contact ring above, and connected with a number of anodes attached to a non-conducting shaft, but without using the resistance coils hereinbefore described, that the density of the current between the lowest anode 1 and the cathode was 690 times greater than the density of the current surrounding the highest anode 9 at the top of the solution and that the several anodes from 2 to 9 inclusive indicated a constantly decreasing amount of amperes in proportion to their increased distance from the cathode and had therefore only a trace or at best but a feeble precipitating action on the metallic compounds in solution above the lowest anode.

In the above experiment the shaft was revolved with the anodes set about one foot apart; the bottom anode 1 being six inches above the cathode.

The same unequal densities prevailed throughout the solution when a direct, undivided and unaltered current of electricity was conducted into the electrolyte through a conducting shaft on which a number of anodes set in the same manner as above described were attached.

Each of the anodes, above the lowest one, which was in closest contact with the cathode, showed a uniform proportional decrease in amperes, the density of the current between the lowest anode 1 and the cathode was 4.14 amperes per square foot of cathode surface, while the density of the current just below the top anode 9 was only .006 amperes per square foot of cathode surface.

The following table gives the registered ampere readings, indicated on a testing ammeter, per square foot of cathode surface, as registered by each anode separately, beginning with the lowest anode 1 and showing a decreased potential at each anode in proportion to the distance between each anode and the cathode:

| | Volts. | Individual anode readings. | Distance from cathode. |
|---|---|---|---|
| | | *Amperes.* | |
| Anode No. 9 | 12 | .006 | 8'6" |
| " " 8 | 12 | .009 | 7'6" |
| " " 7 | 12 | .014 | 6'6" |
| " " 6 | 12 | .026 | 5'6" |
| " " 5 | 12 | .041 | 4'6" |
| " " 4 | 12 | .060 | 3'6" |
| " " 3 | 12 | .140 | 2'6" |
| " " 2 | 12 | .430 | 1'6" |
| " " 1 | 12 | 4.140 | 6" |

The following experiments are herewith set forth for the purpose of comparison and to show the detailed operation of and advantages derived by the present process. So far as I am aware a current of electricity has never been disseminated and distributed throughout a solution by means of a plurality of anodes, through a conducting or non-conducting shaft, and therefore, I deem it necessary to set forth the operation in detail so that the improvement which I claim as new and useful can be fully understood by those desiring to take advantage of the process.

An experiment was conducted in the above tank which contained 4,500 lbs. of .20% potassium cyanid solution, carrying gold and silver in solution. The solution also contained the necessary amount of sodium chlorid to establish the conductivity required.

The current was then led through the contact ring directly to each anode, passing thence through the electrolyte to the cathode for the purpose of precipitating the gold and silver out of the solution and this operation continued for six hours. After each hour a sample of the solution was drawn through a pet cock in the side of the tank just below anodes 1, 5 and 9.

The solution obtained below anode 1 at the end of the first hour, showed that the gold and silver value of the solution had decreased 46% per ton of solution. The sample taken simultaneously below anode 5 showed that the gold and silver value had decreased 36% per ton of solution, while the sample taken simultaneously below anode 9 had decreased only 6% per ton of solution. Samples taken at the end of the second—third—fourth—fifth and sixth hours, showed that the precipitation occurred most rapidly during the first hour, but that the action continued proportionately the same during the remaining five hours at all the respective anodes.

The sample taken below anode 1 at the end of the sixth or final hour showed that the gold and silver value of the solution had decreased 98.2% per ton of solution, while the sample taken simultaneously below anode 5 showed the gold and silver value had decreased 75% per ton of solution, while the sample taken simultaneously below anode 9 had decreased only 50% per ton of solution. The entire contents of the tank was then withdrawn and the solution thoroughly mixed and showed a total precipitation of only 74.4% of the gold and silver from the original solution.

Another experiment was then made with a similar solution carrying the identical values in gold and silver per ton. The resistance coils heretofore described were then put in contact on disk J and connected with the contact ring E and the lead paddles as anodes. The resistance coils were wound with climax wire in such a manner as to deliver to each anode the necessary E. M. F. so that the potential at each anode was altered and maintained in the electrolyte in proportion to its distance from the cathode, thereby regulating the potential between each anode and the cathode, and producing throughout the solution, from the top to the bottom, the required amperage to establish the necessary potential simultaneously in all parts of the solution to decompose and precipitate the metals from their compounds, with the following result:

| | Volts. | Individual anode readings. | Distance from cathode. |
|---|---|---|---|
| | | *Amperes.* | |
| Anode No. 9 | 12 | 2.50 | 8'6" |
| " " 8 | 12 | 2.36 | 7'6" |
| " " 7 | 12 | 2.22 | 6'6" |
| " " 6 | 12 | 2.08 | 5'6" |
| " " 5 | 12 | 1.94 | 4'6" |
| " " 4 | 12 | 1.83 | 3'6" |
| " " 3 | 12 | 1.70 | 2'6" |
| " " 2 | 12 | 1.62 | 1'6" |
| " " 1 | 12 | 1.50 | 6" |

After the above regulated current had been disseminated throughout the electrolyte for one hour, samples of the solution corresponding to those taken in test one, were drawn just below anodes 1, 5 and 9. The solution taken below anode 1 had decreased in value in gold and silver 48% per ton of solution. The sample taken simultaneously just below anode 5 showed the gold and silver value of the solution had decreased 44% per ton of solution, while the sample taken at the same time, just below anode 9 had decreased 35% per ton of solution. Samples taken at the end of the second—third—fourth—fifth and sixth hours showed that the precipitation was proportionately uniform at all the respective anodes. The samples taken at the end of the sixth or final hour showed that the gold and silver value of the solution had decreased below anode 1, 99.9% per ton of solution, while the sample taken simultaneously just below anode 5 showed the gold and silver value had decreased 99.7% per ton of solution, while the sample taken simultaneously just below anode 9 showed the gold and silver value had decreased 99.5% per ton of solution.

A continuation of the operation of the current through the electrolyte for a longer period would have precipitated the trace of gold and silver remaining in the solution, but the time required and the current costs in recovering same commercially, precluded carrying the operation further.

The second table above referred to shows a regulated increase of amperage from the bottom to the top. The applicant does not desire, however, to limit himself to the method of regulating the amperage so that the lowest amperage is at the bottom and the highest at the top, as indicated by this table, but may regulate the amperage that the values of the table may be reversed, and the lowest amperage will be at the top and the highest at the bottom, or the amperage may be substantially equal at each anode. The preferred method is to have the highest amperage at the top, decreasing toward the bottom, but my method broadly contemplates regulation of the amperage at different anodes in the solution.

The use of a non-conducting shaft, or one entirely constructed of non-conducting material and carrying no current into the electrolyte, makes possible the dissemination of different E. M. F. through various anodes at different points in the solution, with the result above described.

The above described method of distributing and disseminating an electric current is also adaptable to and greatly accelerates the dissolution of metals and their compounds from ores in (for example) a cyanid electrolyte by the liberation of cyanogen, at the cathode, according to the following well known equations:

$$2Au+4KCN+O+H_2O=2AuK(CN)_2+2KOH$$
$$2AuK(CN)_2+\text{electric current}+2H_2O=2AuCN+2KOH+2HCN$$
$$2AuCN+\text{electric current}=2Au+2CN \text{ (Au at cathode)}$$
$$2KCN+\text{electric current}=2K+2CN \text{ (K at cathode)}$$
$$2CN+2K=2KCN$$

thereby regenerating the solvent solution and maintaining maximum possible solvent efficency therein, throughout the operation, which results in bringing about a very much more rapid and efficient dissolution of the metals and their compounds than can be obtained if the electric current is not distributed and disseminated by means of a plurality of anodes throughout the electrolyte.

Similar regeneration of solvent is brought about when bromid, chlorin, sulfate or other solvent is used.

I am aware of the fact that patents have been issued in this and other countries for the use of a current of electricity in an electrolyte containing metals for the purpose of dissolution or precipitation, or both, and I do not claim anything by reason of any such action, but what I do claim as new and desire to secure by Letters Patent, is:

1. The process of precipitation of metals from solution by introducing an electric current at a plurality of points throughout a solution, and by regulating the resistance thereto, producing and maintaining any desired density of current throughout the electrolyte, substantially as set forth.

2. The process of treating a solution containing metals, consisting in agitating the solution, in introducing an electric current into the solution at points at different distances from the cathode, and regulating the voltages to maintain any desired density of current throughout the solution.

3. A process of treating a solution containing metals, introducing electric currents into the solution at points at different distances from the cathode, and regulating the voltage at each point in accordance with its distance from the cathode.

In testimony whereof I have signed my name to this specification.

EDWARD ROYAL HOLDEN.